United States Patent
Watkins et al.

(10) Patent No.: US 10,409,513 B2
(45) Date of Patent: Sep. 10, 2019

(54) CONFIGURABLE LOW MEMORY MODES FOR REDUCED POWER CONSUMPTION

(71) Applicant: QUALCOMM Incorporated, San Diego, CA (US)

(72) Inventors: Gabriel Allen Watkins, Rancho Santa Fe, CA (US); Albert Chee-Ming Cheung, San Diego, CA (US); Leonard Widra, Fitchburg, WI (US); Venkateshwar Junnuthulla, Austin, TX (US); Selvaraj Jaikumar, San Diego, CA (US); Mahesh Dandapani Iyer, Saratoga, CA (US); Eugen Pirvu, Mission Viejo, CA (US); Chad Karaginides, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 15/589,581

(22) Filed: May 8, 2017

(65) Prior Publication Data
US 2018/0321865 A1    Nov. 8, 2018

(51) Int. Cl.
*G06F 3/06* (2006.01)
*G06F 1/3206* (2019.01)
(Continued)

(52) U.S. Cl.
CPC .......... *G06F 3/0632* (2013.01); *G06F 1/3206* (2013.01); *G06F 1/3228* (2013.01);
(Continued)

(58) Field of Classification Search
CPC .... G06F 3/0632; G06F 3/0625; G06F 3/0634; G11C 5/147; G11C 5/14; G11C 11/4074; G11C 5/141; G11C 14/00; G11C 5/143
See application file for complete search history.

(56) References Cited

U.S. PATENT DOCUMENTS

| | | | |
|---|---|---|---|
| 6,961,276 B2 | 11/2005 | Atallah et al. | |
| 7,093,149 B2 * | 8/2006 | Tsirkel | G06F 1/3203 713/323 |

(Continued)

FOREIGN PATENT DOCUMENTS

WO    2015042469 A1    3/2015

OTHER PUBLICATIONS

International Search Report and Written Opinion—PCT/US2018/018803—ISA/EPO—dated May 30, 2018.

*Primary Examiner* — Yaima Rigol
(74) *Attorney, Agent, or Firm* — Patterson & Sheridan, LLP

(57) ABSTRACT

Certain aspects of the present disclosure provide apparatus and techniques for configuring memory in an effort to reduce power consumption. For example, certain aspects of the present disclosure may provide an apparatus having a processing system configured to determine an operating mode of an application executing on the processing system. The operating mode may be one of a plurality of operating modes of the application, and each operating mode of the plurality of operating modes may correspond to a different configuration of memory. In certain aspects, the configurations of memory may correspond to different portions of memory that are active or inactive. In certain aspects, the apparatus may also include a memory control module configured to configure the memory based on the determined operating mode of the application.

26 Claims, 7 Drawing Sheets

(51) Int. Cl.
 *G06F 1/3228* (2019.01)
 *G06F 1/3234* (2019.01)

(52) U.S. Cl.
 CPC .......... *G06F 1/3275* (2013.01); *G06F 3/0625* (2013.01); *G06F 3/0634* (2013.01); *G06F 3/0673* (2013.01)

(56) References Cited

U.S. PATENT DOCUMENTS

| | | | | |
|---|---|---|---|---|
| 7,539,884 | B2 * | 5/2009 | You | G06F 1/3203 713/300 |
| 7,821,851 | B2 | 10/2010 | Kim | |
| 8,266,405 | B2 | 9/2012 | Khodabandehlou et al. | |
| 8,542,550 | B2 | 9/2013 | Kim et al. | |
| 8,799,693 | B2 * | 8/2014 | Vick | G06F 1/32 713/320 |
| 9,224,451 | B2 | 12/2015 | Fujisawa | |
| 2003/0014742 | A1 * | 1/2003 | Seth | G06F 8/443 717/158 |
| 2006/0181949 | A1 * | 8/2006 | Kini | G06F 1/3203 365/230.03 |
| 2007/0220293 | A1 * | 9/2007 | Takase | G06F 1/3203 713/320 |
| 2007/0300214 | A1 * | 12/2007 | Chang | G06F 8/4432 717/153 |
| 2008/0082779 | A1 * | 4/2008 | Ogasawara | G06F 1/3203 711/170 |
| 2008/0098243 | A1 | 4/2008 | Saewong et al. | |
| 2009/0077399 | A1 * | 3/2009 | Noda | G03G 15/5004 713/320 |
| 2009/0113162 | A1 | 4/2009 | Di-Zenzo et al. | |
| 2010/0185833 | A1 * | 7/2010 | Saito | G06F 1/3203 712/203 |
| 2010/0275049 | A1 | 10/2010 | Balakrishnan et al. | |
| 2012/0054516 | A1 * | 3/2012 | Shayer | G06F 1/3225 713/320 |
| 2015/0227456 | A1 * | 8/2015 | Bhatia | G06F 1/3203 711/154 |

\* cited by examiner

CONFIGURABLE LOW MEMORY MODES FOR REDUCED POWER CONSUMPTION

TECHNICAL FIELD

The teachings of the present disclosure relate generally to techniques for configuring memory, and more particularly, to reducing power consumption of memory.

INTRODUCTION

Computing devices are ubiquitous. Some computing devices are portable such as mobile phones, tablets, and laptop computers. As the functionality of such portable computing devices increases, the computing or processing power required and generally the data storage capacity to support such functionality also increases. In addition to the primary function of these devices, many include elements that support peripheral functions. For example, a cellular telephone may include the primary function of enabling and supporting cellular telephone calls and the peripheral functions of a still camera, a video camera, global positioning system (GPS) navigation, web browsing, sending and receiving emails, sending and receiving text messages, push-to-talk capabilities, etc. Reduction of power consumption is a common goal for electronic systems. For example, usage of random access memory (RAM) may consume power. Reducing such power consumed by RAM may therefore reduce power consumption of the overall electronic system and prolong battery life.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some aspects, the present disclosure provides an apparatus. The apparatus generally includes a processing system configured to determine an operating mode of an application executing on the processing system, the operating mode being one of a plurality of operating modes of the application, wherein each operating mode of the plurality of operating modes corresponds to a different configuration of memory, the configurations of memory corresponding to different portions of memory that are active or inactive, and a memory control module configured to configure the memory based on the determined operating mode of the application.

In some aspects, the present disclosure provides a method for configuring memory. The method generally includes determining an operating mode of an application executing on the processing system, the operating mode being one of a plurality of operating modes of the application, wherein each operating mode of the plurality of operating modes corresponds to a different configuration of memory, the configurations of memory corresponding to different portions of memory that are active or inactive, and configuring the memory based on the determined operating mode of the application.

In some aspects, the present disclosure provides an apparatus. The apparatus generally includes means for determining an operating mode of an application executing on the processing system, the operating mode being one of a plurality of operating modes of the application, wherein each operating mode of the plurality of operating modes corresponds to a different configuration of memory, the configurations of memory corresponding to different portions of memory that are active or inactive, and means for configuring the memory based on the determined operating mode of the application.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
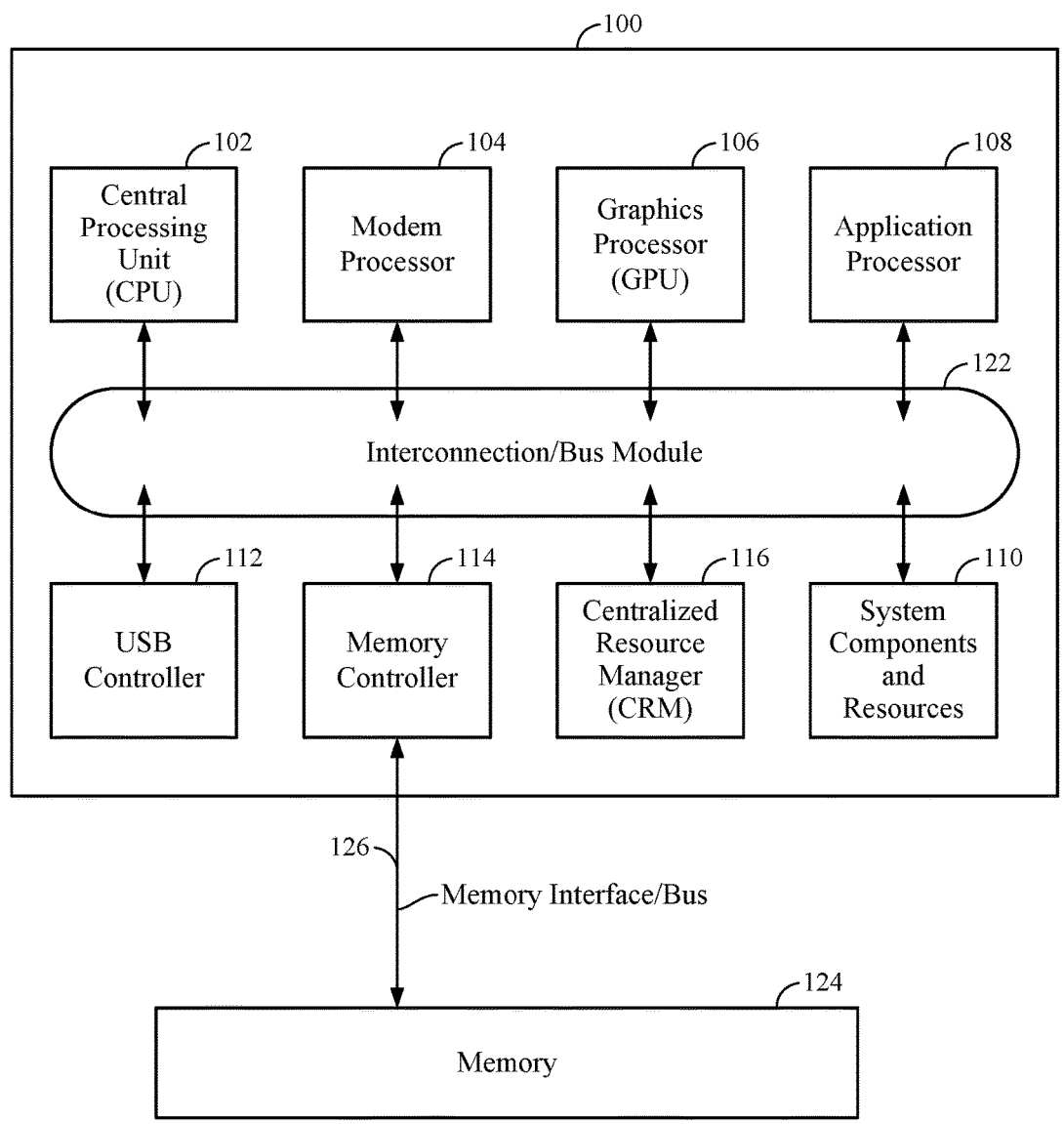
FIG. 1 is an illustration of an exemplary system-on-chip (SoC) integrated circuit design, in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" and "mobile device" are used interchangeably herein to refer to any one or all of servers, personal computers, smartphones, cellular telephones, tablet computers, laptop computers, netbooks, ultrabooks, palm-top computers, personal data assistants (PDA's), wireless electronic mail receivers, multimedia Internet enabled cellular telephones, Global Positioning System (GPS) receivers, wireless gaming controllers, and similar personal electronic devices which include a programmable processor. While the various aspects are particularly useful in mobile devices (e.g., smartphones, laptop computers, etc.), which have limited resources (e.g., processing power, battery, etc.), the aspects are generally useful in any computing device that may benefit from improved processor performance and reduced energy consumption.

The term "multicore processor" is used herein to refer to a single integrated circuit (IC) chip or chip package that contains two or more independent processing units or cores (e.g., CPU cores, etc.) configured to read and execute program instructions. The term "multiprocessor" is used herein to refer to a system or device that includes two or more processing units configured to read and execute program instructions.

The term "system on chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.), any or all of which may be included in one or more cores.

A number of different types of memories and memory technologies are available or contemplated in the future, all of which are suitable for use with the various aspects. Such memory technologies/types include phase change memory (PRAM), dynamic random-access memory (DRAM), static random-access memory (SRAM), non-volatile random-access memory (NVRAM), pseudostatic random-access memory (PSRAM), double data rate synchronous dynamic random-access memory (DDR SDRAM), and other random-access memory (RAM) and read-only memory (ROM) technologies known in the art. A DDR SDRAM memory may be a DDR type 1 SDRAM memory, DDR type 2 SDRAM memory, DDR type 3 SDRAM memory, or a DDR type 4 SDRAM memory. Each of the above-mentioned memory technologies include, for example, elements suitable for storing instructions, programs, control signals, and/or data for use in or by a computer or other digital electronic device.

Any references to terminology and/or technical details related to an individual type of memory, interface, standard or memory technology are for illustrative purposes only, and not intended to limit the scope of the claims to a particular memory system or technology unless specifically recited in the claim language.

Mobile computing device architectures have grown in complexity, and now commonly include multiple processor cores, SoCs, co-processors, functional modules including dedicated processors (e.g., communication modem chips, GPS receivers, etc.), complex memory systems, intricate electrical interconnections (e.g., buses and/or fabrics), and numerous other resources that execute complex and power intensive software applications (e.g., video streaming applications, etc.). With this rise in complexity, new memory management solutions may be needed to improve the computational and power management performance of mobile devices. For example, certain systems may allow for the execution of code directly from external (non-volatile) flash memory via a special cache memory. This may be referred to as execute in place (XIP).

Certain aspects of the present disclosure propose techniques for reducing power consumption in a device (e.g., a SoC) by configuring memory in accordance with an operating mode of an application in an effort to reduce power consumption. The various aspects may be implemented in a wide variety of computing systems, including single processor systems, multi-processor systems, multicore processor systems, systems-on-chip (SoC), or any combination thereof.

FIG. 1 illustrates example components and interconnections in a system-on-chip (SoC) 100 suitable for implementing various aspects of the present disclosure. The SoC 100 may include a number of heterogeneous processors, such as a central processing unit (CPU) 102, a modem processor 104, a graphics processor 106, and an application processor 108. Each processor 102, 104, 106, 108, may include one or more cores, and each processor/core may perform operations independent of the other processors/cores. The processors 102, 104, 106, 108 may be organized in close proximity to one another (e.g., on a single substrate, die, integrated chip, etc.) so that they may operate at a much higher frequency/clock-rate than would be possible if the signals were to travel off-chip. The proximity of the cores may also allow for the sharing of on-chip memory and resources (e.g., voltage rail), as well as for more coordinated cooperation between cores.

The SoC 100 may include system components and resources 110 for managing sensor data, analog-to-digital conversions, wireless data transmissions, and for performing other specialized operations (e.g., decoding high-definition video, video processing, etc.). System components and resources 110 may also include components such as voltage regulators, oscillators, phase-locked loops, peripheral bridges, data controllers, system controllers, access ports, timers, and other similar components used to support the processors and software clients running on the computing device. The system components and resources 110 may also include circuitry for interfacing with peripheral devices, such as cameras, electronic displays, wireless communication devices, external memory chips, etc.

The SoC 100 may further include a universal serial bus controller 112, one or more memory controllers 114 (e.g., a dynamic random access memory (DRAM) memory controller), and a centralized resource manager (CRM) 116. The SoC 100 may also include an input/output module (not illustrated) for communicating with resources external to the SoC, such as a clock 118 and a voltage regulator 120, each of which may be shared by two or more of the internal SoC components.

The processors 102, 104, 106, 108 may be interconnected to the USB controller 112, the memory controller 114, system components and resources 110, CRM 116, and other system components via an interconnection/bus module 122, which may include an array of reconfigurable logic gates and/or implement a bus architecture (e.g., CoreConnect, AMBA, etc.). Communications may also be provided by advanced interconnects, such as high performance networks-on chip (NoCs).

The interconnection/bus module 122 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. In an aspect, the bus module 130 may include a direct memory access (DMA) controller (not illustrated) that enables components connected to the bus module 122 to operate as a master component and initiate memory transactions. The bus module 122 may also implement an arbitration scheme to prevent multiple master components from attempting to drive the bus simultaneously.

The memory controller 114 may be a specialized hardware module configured to manage the flow of data to and from a memory 124 (e.g., DRAM, RAM, etc.) via a memory interface/bus 126. For example, the memory controller 114 may comprise one or more processors configured to perform operations disclosed herein. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In certain aspects, the memory 124 may be part of the SoC 100.

Though certain aspects are described herein with respect to the memory controller 114 managing the flow of data to and from a memory 124, and to controlling the bandwidth of accessing memory 124, similar techniques may be applied to any suitable on-chip or off-chip memory (e.g., a memory on the same or a different substrate, die, integrated chip, etc., as the other components of the SoC 100). The memory controller 114 may include logic for interfacing with the memory 124, such as activating or deactivating portion of the memory 124, selecting a row and column in the DRAM memory corresponding to a memory location, reading or writing data to the memory location, etc.

Accordingly, aspects of the present disclosure propose techniques for reducing power consumption in a device. For example, reducing the power consumption of the device may involve deactivating certain portions of memory (e.g., memory 124) (or going to a low power state for the device) based on different operating modes of an application executing on the device.

Aspects of the present disclosure allow for a reduction in power consumption to enable long battery life. For example, power may be saved by allowing RAM banks to be power collapsed (e.g., in a not loaded configuration). In some cases, power may be saved by keeping RAM banks in retention (e.g., in an inactive configuration) when the CPU is active. For example, there may be no running timers, no registered interrupts, no (or minimal) dynamic memory allocated, and no threads running. Aspects of the present disclosure also reduce OEM development time for low power applications.

Figure 2:
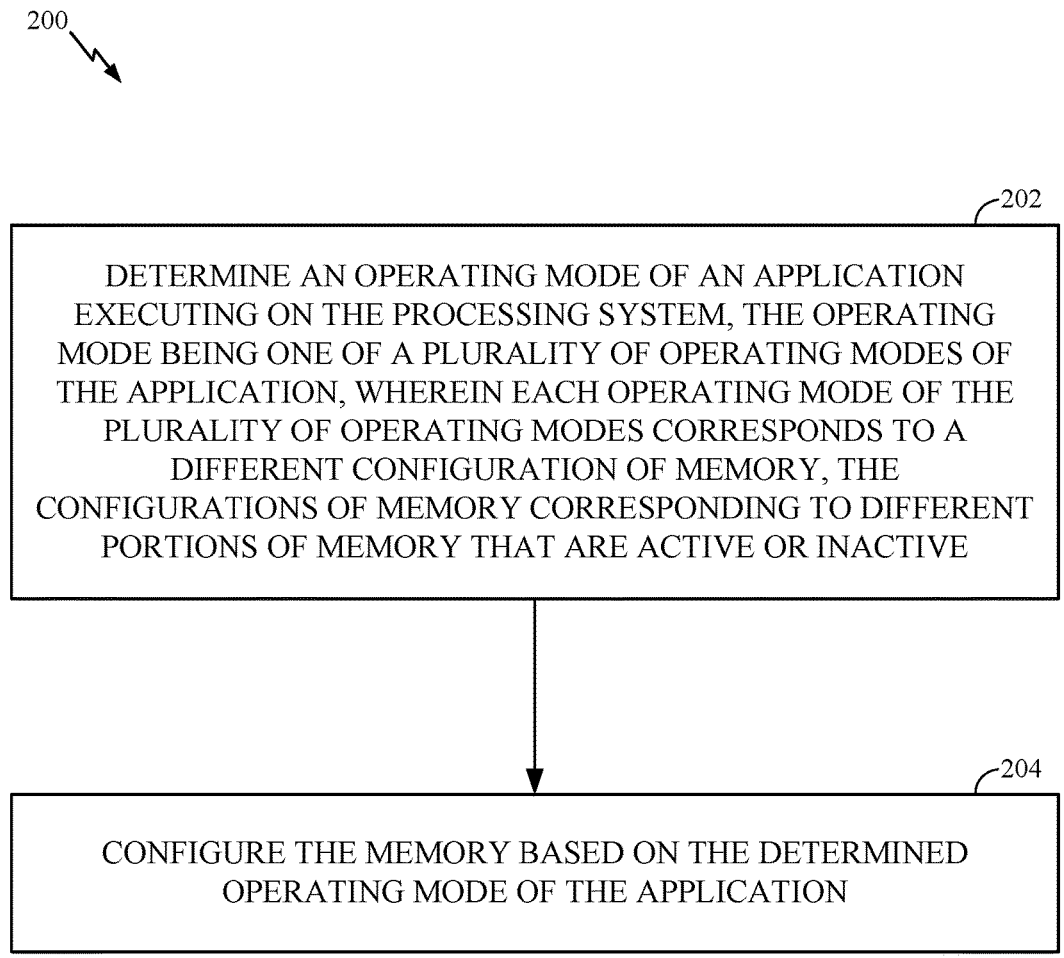
FIG. 2 illustrates example operations for configuring memory, in accordance with certain aspects of the present disclosure.

FIG. 2 illustrates example operations 200 for configuring memory, in accordance with certain aspects of the present disclosure. Operations 200 may be performed by one or more components on a SoC, such as CPU 102 and/or memory controller 114.

The operations 200 may begin, at block 202, by determining an operating mode of an application executing on the processing system, the operating mode being one of a plurality of operating modes of the application. In certain aspects, each operating mode of the plurality of operating modes may correspond to a different configuration of memory, the configurations of memory corresponding to different portions of memory that are active or inactive. The operations 200 continue, at block 204, by configuring the memory based on the determined operating mode of the application. For example, the application may include a plurality of operations as will be described herein. In each of the operating modes, different operations of the plurality of operations may be placed in different states corresponding to one of the memory configurations.

Figure 3:
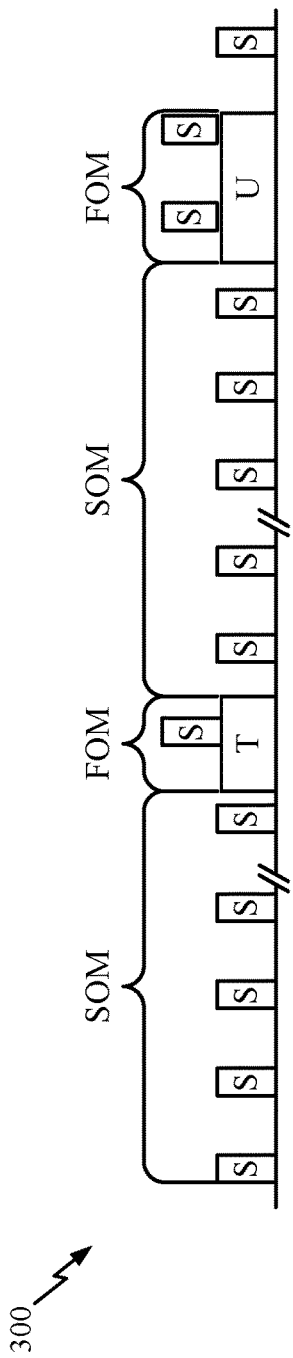
FIG. 3 is a timing diagram illustrating different operating modes of an application, in accordance with certain aspects of the present disclosure.

FIG. 3 is a timing diagram 300 illustrating different operating modes of an application, in accordance with certain aspects of the present disclosure. An application executing on a device (e.g., SoC 100) may carry out several operations which may be carried out at different points in time. For example, a first operation (e.g., sensing (S) a temperature) may be carried out by the application every few seconds, while other operations may be carried out every few minutes or every few days. Based on the operations the application is expected to carry out during a certain time period, an operating mode of the application may be determined at block 202 of FIG. 2. For example, if multiple operations are to be carried out, it may be determined that the application should operate in a full operating mode (FOM), during which the application can execute the multiple operations. For example, the FOM of the application may use enough RAM for each of operations S, T, and U to run. However, when the application is only sensing a temperature for a period of time, a sensor operating mode (SOM) may be determined for the application where only enough RAM may be used to run operation S. In other words, as will be described in FIG. 4, during the SOM, other portions of memory that are not used for operation S may be deactivated to save power.

Figure 4:
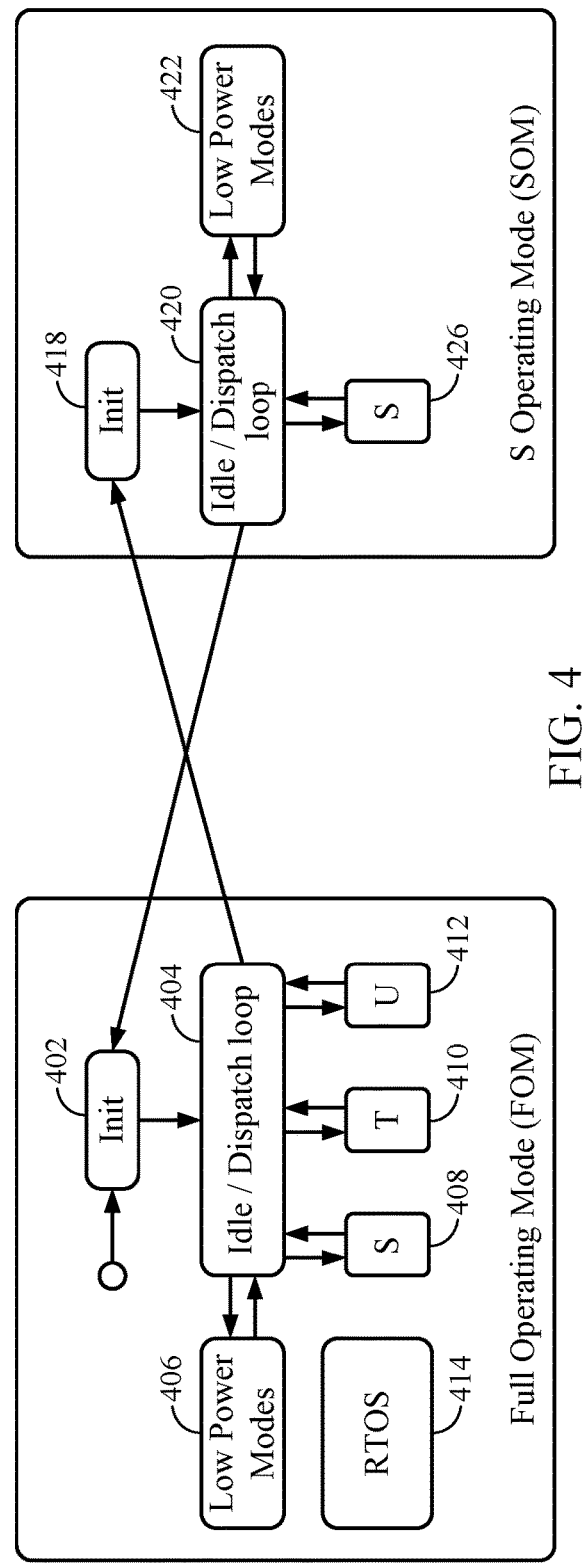
FIG. 4 illustrates example operations for transitioning between operating modes, in accordance with certain aspects of the present disclosure.

FIG. 4 illustrates example operations 400 for transitioning between operating modes, in accordance with certain aspects of the present disclosure. The operations 400 may be performed by a processor, such as the CPU 102, executing an application configured to execute different operations as described with respect to FIG. 3. As illustrated, the operations 400 may begin, at block 402, by initializing systems for the operations (e.g., operations S, T, and U) to be performed during the FOM. For example, the application operating on the CPU 102 may initialize drivers or memory at this stage. In other words, the initialization logic at block 402 may activate portion of memory 124 and drivers corresponding to the FOM.

At block 404, the application may enter an idle/dispatch logic loop. For example, when the application is idle (e.g., awaiting execution of one or more operations), the CPU 102 may enter a low power mode, at block 406. The dispatch logic loop, at block 404, may dispatch execution of one or more operations at blocks 408, 410, and 412. For example the dispatch logic loop may dispatch execution of operation S (e.g., temperature sensor readout) at block 408, operation T at block 410, or an operation U at block 412. At block 414, the FOM may use a real-time operating system (RTOS) scheduling algorithm to schedule execution of tasks.

In certain aspects, the application may be aware of its current state and when it is to change operating modes. Therefore, the application may control the underlying hardware (e.g., the memory controller 114) to activate or deactivate certain portions of the memory 124 to reduce power consumption by indicating when it changes operating modes. Thus, in each of the operating modes, the application may be configured to determine different operations that are to be placed in different states corresponding to one of the memory configurations. In other words, the application may change its operating mode to a sensor operating mode (SOM) by executing the initialization logic at block 418, and in certain aspects, deactivate portion of memory that may not be used by the SOM. For example, the initialization logic, at block 418, may deactivate a portion of memory 124 and/or deactivate certain drivers as previously determined for the SOM. The idle/dispatch loop logic, at block 420, may place the application in low-power mode, at block 422, while idle (e.g., awaiting execution of an operation) and dispatch the operation S, at block 424, at set intervals, as described with respect to FIG. 3.

In certain aspects, the determination of the operating mode at block 202 of FIG. 2 may be based on a latency requirement of the application. In other words, transitioning to the SOM may result in increased latency when executing different operations. For example, if the application has transitioned to the SOM, executing operation T involves transitioning back to the FOM, resulting in increased latency. For certain application and operations, such latency may not be inhibitive. However, latency may be important for the execution of certain operations, which should be taken into account when determining to transition to an operating mode.

Figure 5:
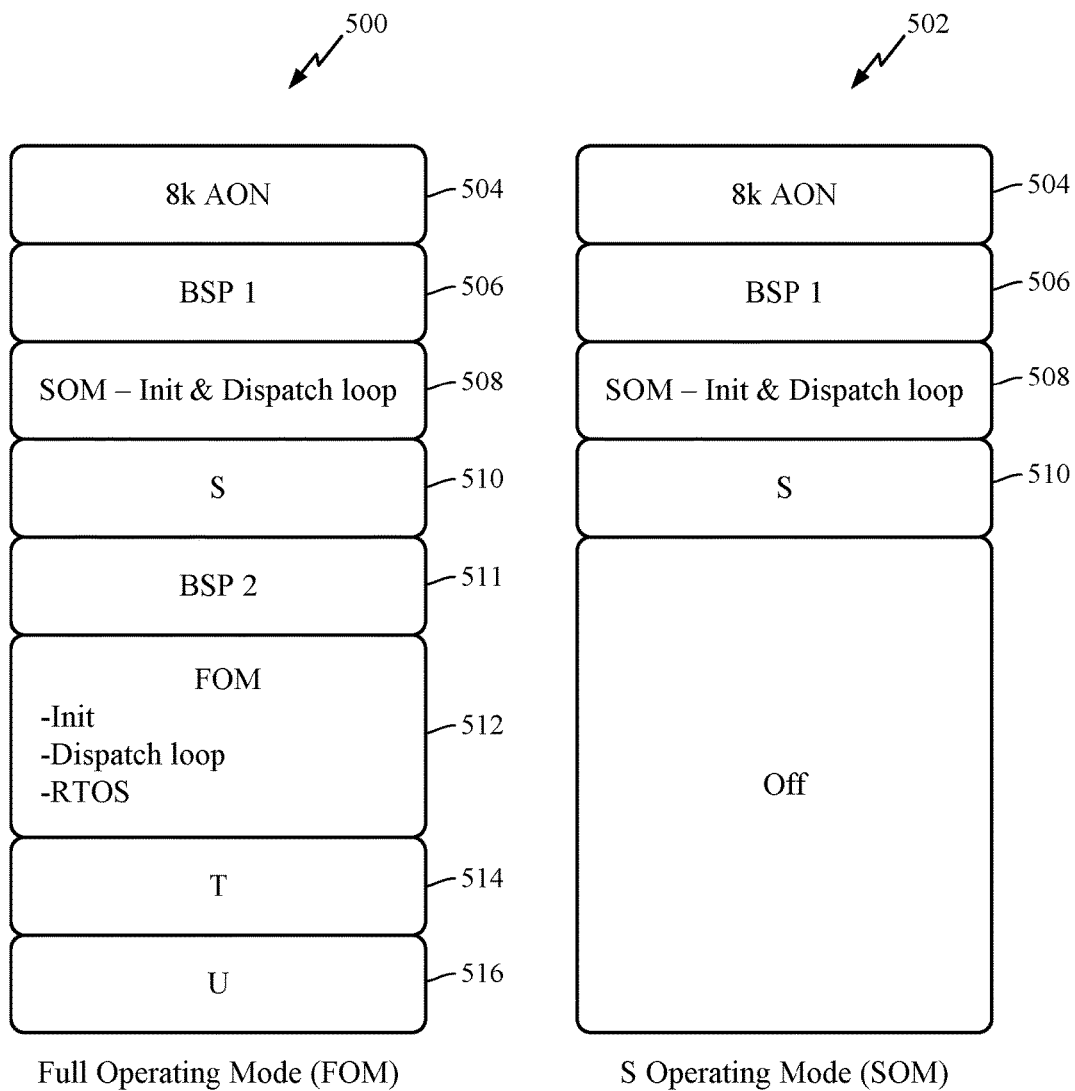
FIG. 5 illustrates memory configurations corresponding to different operating modes, in accordance with certain aspects of the present disclosure.

FIG. 5 illustrates memory configurations 500 and 502 corresponding to different operating modes, in accordance with certain aspects of the present disclosure. The memory configuration 500 may correspond to the FOM and have portions of memory that may be used to execute the operations in the FOM activated. For example, the portion 504 may include an always on (AON) 8 k block of memory which may partly allocated for original equipment manufacturer (OEM) use and a portion 506 may include board support package (BSP) data.

The portion 508 may include the algorithm for the initialization and dispatch loop for the SOM, and the portion 510 may include the algorithm for the sensing operation S, as described with respect to FIG. 4. As illustrated in the memory configuration 502, all other portion of memory may be deactivated during the SOM to reduce power consumption. However, for the memory configuration 500, one or more other portion of memory may be active to allow for the execution of other operations during the FOM. For example, the memory configuration 502 may also include a portion 512 including the algorithm for the initialization and dispatch loop for the FOM, and portions 514 and 516 including the algorithms for the operation T and operation U.

Figure 6:
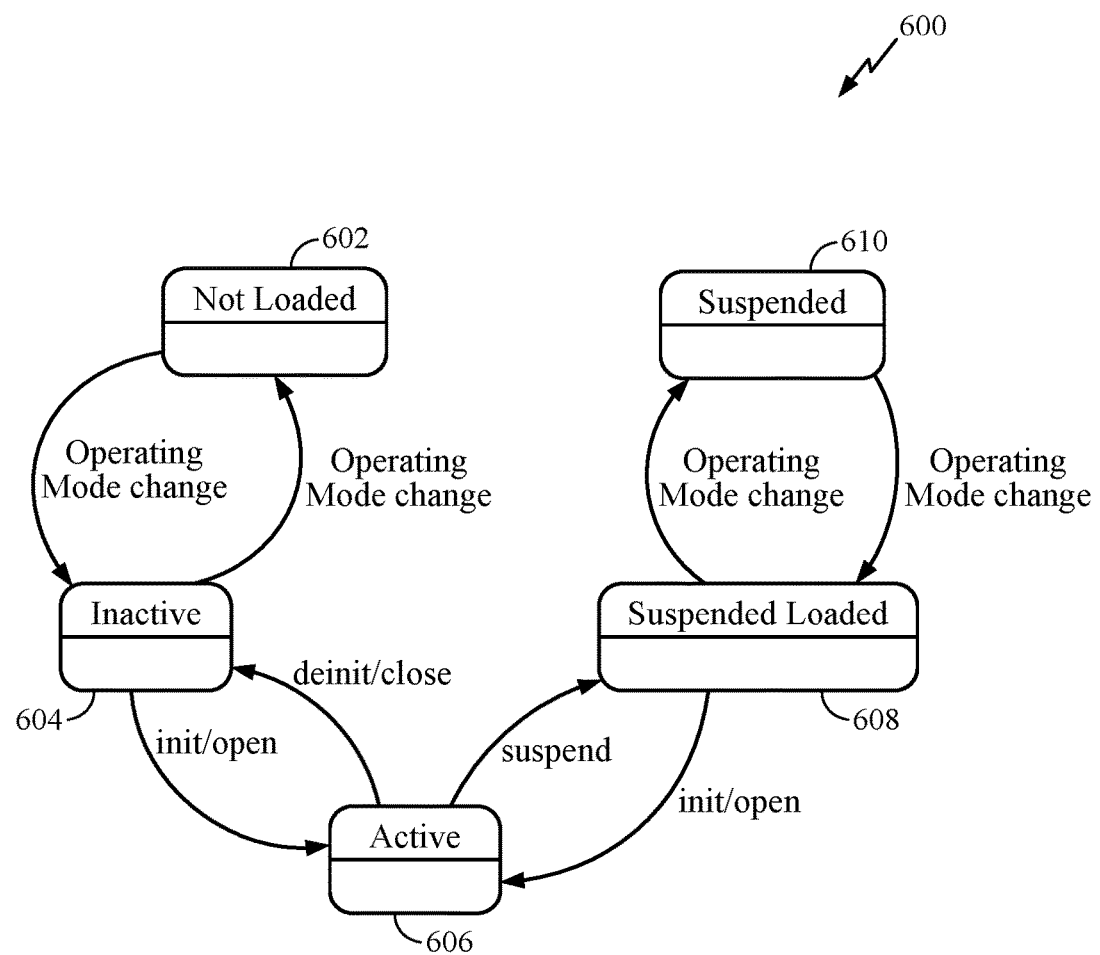
FIG. 6 is a state diagram illustrating different configurations of memory, in accordance with certain aspects of the present disclosure.

FIG. 6 is a state diagram 600 illustrating different configurations of memory, in accordance with certain aspects of the present disclosure. In certain aspects, the individual operations of an application may be placed in the different operating modes individually, as described above. In the not loaded configuration 602, no code or data for an operation may be present in RAM. In the inactive configuration 604, code and data for the operation may be present in RAM but not active. For example, there may be no running timers, no registered interrupts, no (or minimal) dynamic memory allocated, and no threads running. In certain aspects, during the SOM, the portion of memory corresponding to the FOM may be either in a non-loaded configuration, or in an inactive configuration, allowing for a faster restart of the FOM.

The active configuration 606 may correspond to normal operation. For example, during the FOM, all available portion of memory as described with respect to FIG. 5 may be in the active configuration. The suspended configuration 610 may be similar to the not loaded configuration 602, except that a small amount of data may be kept in RAM to allow for a quicker restart. The suspended loaded configuration 608 may be similar to the inactive configuration 604, except that a small amount of data may be kept in RAM to allow quicker restart.

When there is an operating mode change, the memory configuration may be transitioned by the application from the not loaded configuration 602 to the inactive configuration 604. During this transition, execute in place (XIP) may be turned on if XIP code is to be used for the operation. XIP generally refers to a method of executing programs directly from long term storage rather than copying the corresponding code into RAM. Moreover, code and read/write (R/W) data may be copied to RAM, and zero initialized (ZI) data may be allocated and zeroed. However, during the inactive configuration 604, no code may be running. To transition from the inactive configuration 604 to the not loaded configuration 602, code and data may be removed from RAM and XIP may be turned off.

Once the initialization and open function is called, the memory configuration may transition to the active configuration 606. In this configuration, timers may be started, interrupt service routines (ISRs) may be registered, threads may be created, and dynamic memory may be allocated. When transitioning from the active configuration 606 to the inactive configuration 604, timers may be stopped ISRs may be deregistered, all drivers may be closed, all votes on power resources may be released, all threads may be stopped and dynamic memory may be deallocated.

To transition from the active configuration 606 to the suspended loaded configuration 608, the application may stop all timers, deregister all ISRs, close all drivers and other modules that may been opened, release all votes on power resources, stop all threads, de-allocate all dynamic memory, and save state information in RAM that may be kept on. To transition from the suspended loaded configuration 608 to suspended configuration 610, code and data (e.g., except the retained state information) may be removed from RAM, and XIP may be turned off.

In certain aspects of the present disclosure, data stored in a portion of memory may be shared across multiple operating modes. For example, the AON portion 504 may be shared. In certain aspects, static allocations may be shared between operating modes. For example, operating mode images may be arranged such that .data and .bss sections are placed in the same physical addresses in both images.

In certain aspects, a heap portion of the memory may be shared between operating modes. A heap manager may be used to support multiple heaps and each operating mode may have a default heap that is not shared. In certain aspects of the present disclosure, memory may be allocated for additional heaps during memory map creation and addresses of this memory may be passed to the heap manager to create additional heaps. In certain aspects, heap regions of memory may be common across operating mode images such that heap regions can be shared. In certain aspects, a mechanism such as a static allocation technique may be used to maintain pointers to data on the heap.

Certain aspects of the present disclosure provide techniques for developing a device configured to perform an operation (e.g., sensing a temperature). For example, code for the FOM and SOM applications may be provided. Moreover, the application code to perform the device functions in each operating mode may be provided, as well as code for switching operating modes. Code for entry/exit functions to initialize/de-initialize drivers and services on entry/exit from an operating mode may also be provided. In certain aspects, the memory map may be designed to determine the FOM and the SOM regions, as described with respect to FIG. 5. This may include the appropriate indirection tables and patches for read-only memory (ROM) code used in each mode. The memory map may also include a shared memory area to allow the FOM and the SOM applications to communicate. Once the memory map has been designed, the operating mode transition table may be provided including the memory configuration for each operating mode, image to be present for each operating mode, the entry point for each operating mode, and allowable transitions between operating modes. At this point, the code may be assigned to the images (e.g., assign objects to sections and assign sections to physical addresses).

Certain aspects of the present disclosure are generally directed to rules for drivers and services to support operating modes. The rules may be intended to reduce the amount of ZI and RW data used by a device. In particular, the amount of RAM allocated in the always on (AON) 8 k region may be reduced. Moreover, startup, initialization, and open functions and corresponding shutdown, de-initialization, and close functions may be provided. In certain aspects, prior to startup and after shutdown, the device should have a low memory footprint. For example, it should be possible to perform multiple startup/shutdown cycles without resetting the system. Modules may support one or more active states where functionality, performance and/or memory usage is reduced. For example, debug services may offer different states with different log buffer sizes. Devices may also support one or more standby states where most (or all) functionality is not available and memory usage is reduced, but still allow for return to the FOM faster than performing a regular startup, initialization, and open function.

Figure 7A:
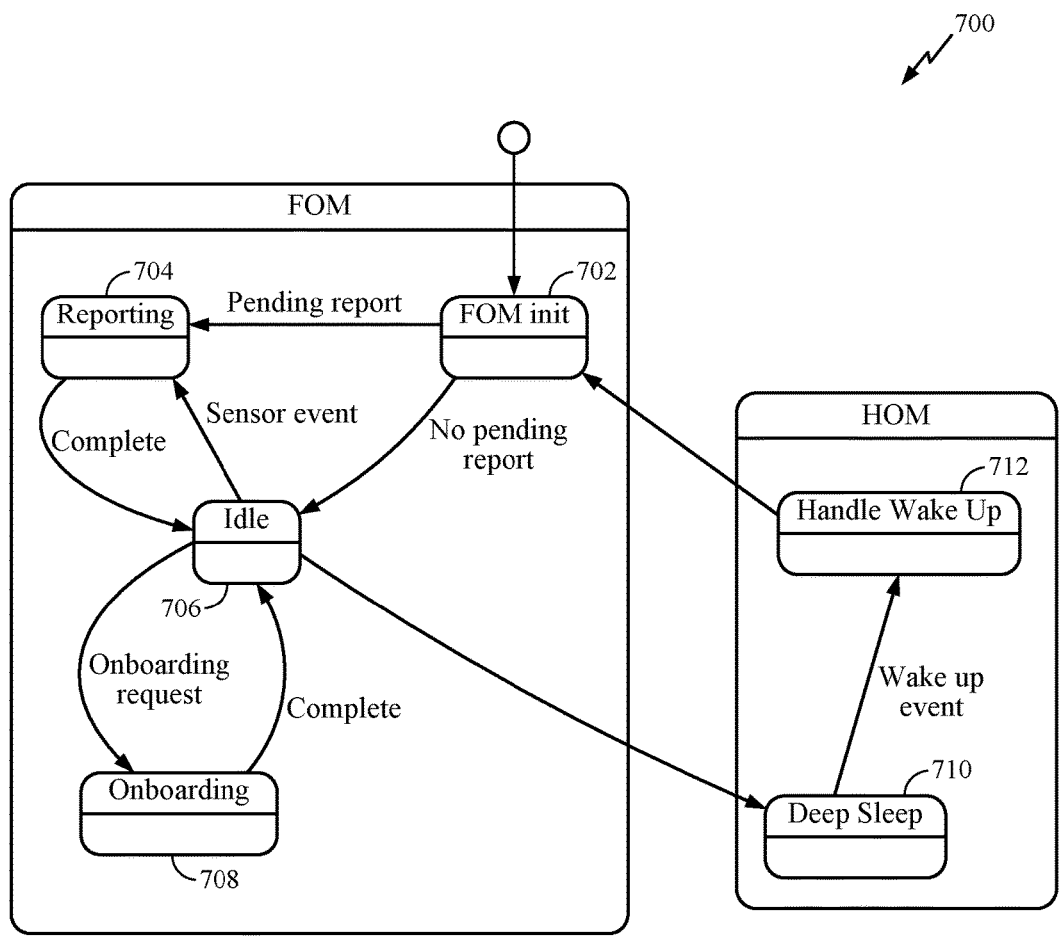
FIGS. 7A and 7B illustrate example operations for transitioning between the operating modes and corresponding memory configurations, in accordance with certain aspects of the present disclosure.
Figure 7B:
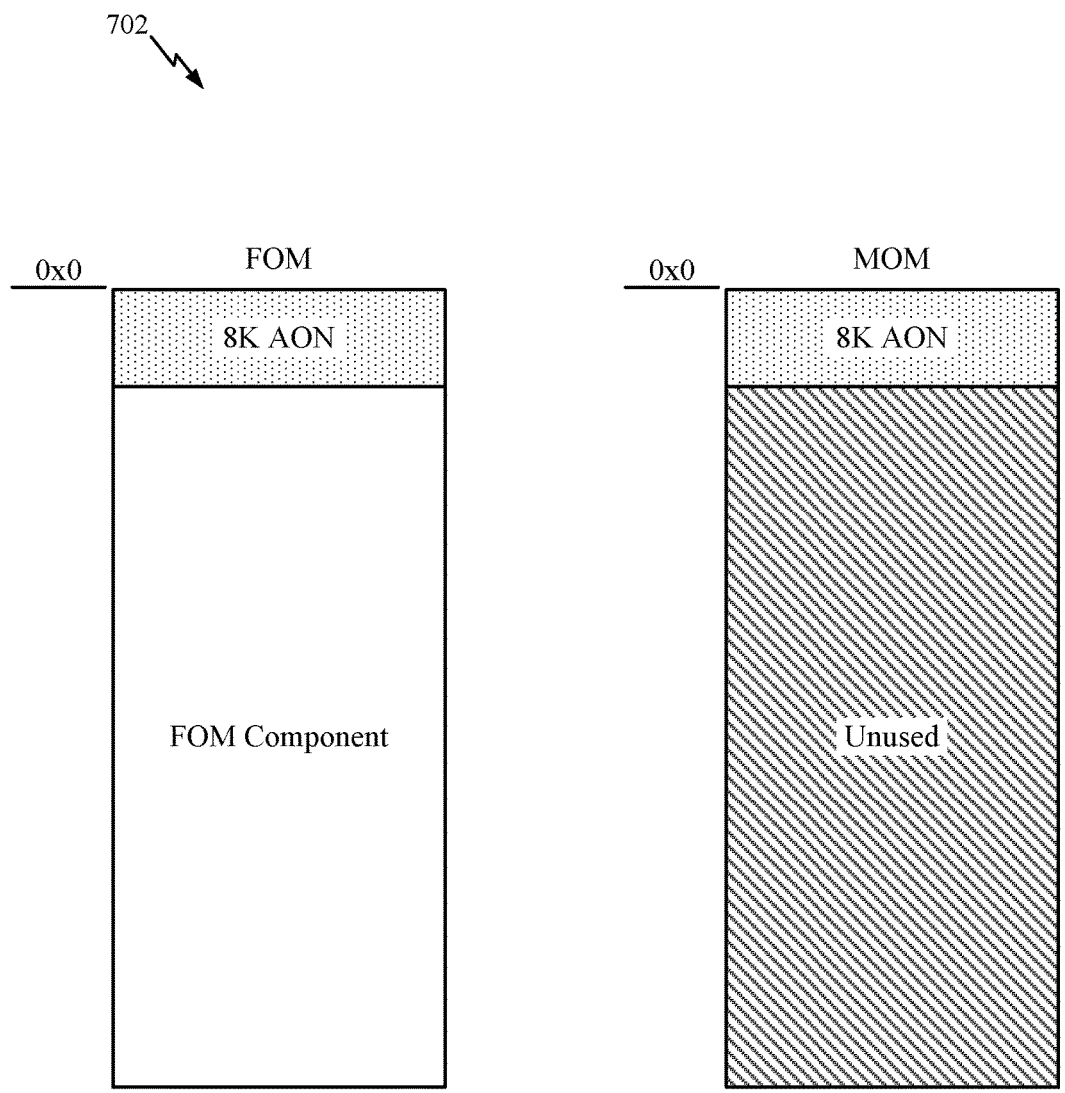

FIGS. 7A and 7B illustrate example operations 700 for transitioning between the FOM and a minimum operating mode (MOM) and corresponding memory configurations 702, in accordance with certain aspects of the present disclosure. As illustrated, the FOM may be initialized at block 702. If there is pending information to be reported, the operations 700 may continue by reporting the information at block 704 and subsequently continuing to idle mode at block 706. When there is an onboarding request, the operations 700 may transition to the onboarding block 708, where one or more operations may be executed, and subsequently return to idle mode at block 706.

In certain aspects, the application may determine to enter the MOM and transition to deep sleep at block 710. In the MOM, portion of memory may be deactivated as illustrated in FIG. 7B. For example, in the MOM, only the AON portion of memory may be active. During the MOM, almost no operations may be available. At a certain point, a wake up event may occur and the wake up handling operation may begin at block 712. At this stage, the application may transition to the FOM, as illustrated. In certain aspects, instead of transitioning to FOM after the wake up event at block 712, the application may transition to the SOM as described with respect to FIG. 4.

Certain aspects of the present disclosure also provide a compiler for converting software to operate within confines of at least one of the memory configurations. For example, an application from an OEM may be input into the compiler and configured to support multiple operating modes as described herein, reducing the power consumption of the application.

In some configurations, the term(s) 'communicate,' 'communicating,' and/or 'communication' may refer to 'receive,' 'receiving,' 'reception,' and/or other related or suitable aspects without necessarily deviating from the scope of the present disclosure. In some configurations, the term(s) 'communicate,' 'communicating,' 'communication,' may refer to 'transmit,' 'transmitting,' 'transmission,' and/or other related or suitable aspects without necessarily deviating from the scope of the present disclosure.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits.

One or more of the components, steps, features and/or functions illustrated herein may be rearranged and/or combined into a single component, step, feature or function or embodied in several components, steps, or functions. Additional elements, components, steps, and/or functions may also be added without departing from novel features disclosed herein. The apparatus, devices, and/or components illustrated herein may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one"

unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

These apparatus and methods described in the detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

What is claimed is:

1. An apparatus, comprising:
a processing system configured to determine an operating mode of an application executing on the processing system, the operating mode being one of a plurality of operating modes of the application, wherein each operating mode of the plurality of operating modes corresponds to a different configuration of memory, the configurations of memory corresponding to different portions of memory that are active or inactive, wherein the application comprises a plurality of operations and is configured with different states, wherein in each of the operating modes, different operations of the plurality of operations are placed in the different states corresponding to one of the memory configurations; and
a memory control module configured to configure the memory based on the determined operating mode of the application.

2. The apparatus of claim 1, wherein the processing system is further configured to determine a service to be provided by the apparatus, wherein the operating mode is determined based on the service.

3. The apparatus of claim 1, wherein the operating mode comprises a full operating mode (FOM), wherein the FOM corresponds to a configuration of memory where portions of the memory corresponding to multiple operations are active.

4. The apparatus of claim 1, wherein:
the processing system is configured to determine another operating mode; and
the apparatus comprises a transition module configured to transition between a first memory configuration corresponding to the operating mode and a second memory configuration corresponding to the other operating mode.

5. The apparatus of claim 4, wherein transitioning between the first memory configuration and the second memory configuration comprises deactivating a portion of the memory corresponding to the first memory configuration.

6. The apparatus of claim 4, wherein transitioning between the first memory configuration and the second memory configuration comprises configuring a portion of the memory corresponding to the first memory configuration in a state where code for the operating mode is stored in the portion of the memory, but is inactive.

7. The apparatus of claim 1, wherein the different configurations comprise at least one configuration where only an always on (AON) portion of memory is active.

8. The apparatus of claim 1, wherein the operating mode is determined based on a latency requirement of the application.

9. The apparatus of claim 1, wherein a portion of the memory is shared between the different operating modes.

10. The apparatus of claim 9, wherein the shared portion comprises a heap portion of the memory.

11. The apparatus of claim 1, wherein the memory control module is configured to activate or inactivate one or more drivers based on the determined operating mode.

12. The apparatus of claim 1, wherein the processing system is further configured to convert software to operate within confines of at least one of the memory configurations.

13. A method for configuring memory, comprising:
determining an operating mode of an application executing on a processing system, the operating mode being one of a plurality of operating modes of the application, wherein each operating mode of the plurality of operating modes corresponds to a different configuration of memory, the configurations of memory corresponding to different portions of memory that are active or inactive, wherein the application comprises a plurality of operations and is configured with different states, wherein in each of the operating modes, different operations of the plurality of operations are placed in the different states corresponding to one of the memory configurations; and configuring the memory based on the determined operating mode of the application.

14. The method of claim 13, further comprising determining a service to be provided, wherein the operating mode is determined based on the service.

15. The method of claim 13, wherein the operating mode comprises a full operating mode (FOM), wherein the FOM corresponds to a configuration of memory where portions of the memory corresponding to multiple operations are active.

16. The method of claim 13, further comprising:
determining another operating mode; and
transitioning between a first memory configuration corresponding to the operating mode and a second memory configuration corresponding to the other operating mode.

17. The method of claim 16, wherein transitioning between the first memory configuration and the second memory configuration comprises deactivating a portion of the memory corresponding to the first memory configuration.

18. The method of claim 16, wherein transitioning between the first memory configuration and the second memory configuration comprises configuring a portion of the memory corresponding to the first memory configuration in a state where code for the operating mode is stored in the portion of the memory, but is inactive.

19. The method of claim 13, wherein the different configurations comprise at least one configuration where only an always on (AON) portion of memory is active.

20. The method of claim 13, wherein the operating mode is determined based on a latency requirement of the application.

21. The method of claim 13, wherein a portion of the memory is shared between the different operating modes.

22. The method of claim 21, wherein the shared portion comprises a heap portion of the memory.

23. The method of claim 13, further comprising activating or deactivating one or more drivers based on the determined operating mode.

24. The method of claim 13, wherein the processing system is further configured to convert software to operate within confines of at least one of the memory configurations.

25. An apparatus for configuring memory, comprising:
means for determining an operating mode of an application executing on the means for determining, the operating mode being one of a plurality of operating modes of the application, wherein each operating mode of the plurality of operating modes corresponds to a different configuration of memory, the configurations of memory corresponding to different portions of memory that are active or inactive, wherein the application comprises a plurality of operations and is configured with different states, wherein in each of the operating modes, different operations of the plurality of operations are placed in the different states corresponding to one of the memory configurations; and
means for configuring the memory based on the determined operating mode of the application.

26. A non-transitory computer-readable medium having instructions stored thereon for:
determining an operating mode of an application executing on a processing system, the operating mode being one of a plurality of operating modes of the application, wherein each operating mode of the plurality of operating modes corresponds to a different configuration of memory, the configurations of memory corresponding to different portions of memory that are active or inactive, wherein the application comprises a plurality of operations and is configured with different states, wherein in each of the operating modes, different operations of the plurality of operations are placed in the different states corresponding to one of the memory configurations; and
configuring the memory based on the determined operating mode of the application.

* * * * *